US006611697B1

(12) United States Patent
Ewing et al.

(10) Patent No.: US 6,611,697 B1
(45) Date of Patent: Aug. 26, 2003

(54) ACCESSORY FOR PROVIDING LIGHT BASED FUNCTIONALITY TO A MOBILE COMMUNICATIONS DEVICE

(75) Inventors: Pam Ewing, Wylie, TX (US); Farzad Hiri, Richardson, TX (US); Bret Westbrook, Richardson, TX (US); David Boltz, Garland, TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/469,095

(22) Filed: Dec. 21, 1999

(51) Int. Cl.[7] .................................................. H40B 1/38
(52) U.S. Cl. ........................ 455/575; 455/90; 455/550; 320/114; 362/109
(58) Field of Search ................................ 455/556–557, 455/404, 550, 567, 568, 572, 343, 127, 90, 575; 307/10.8; 320/2, 15, 113; 340/521, 540, 567, 573, 691, 693; 250/342, 221; 379/442, 447, 450, 355.1, 456, 61; 315/82; 701/29, 36; 345/467, 102; 362/231, 246, 558, 31, 555, 561, 559, 190, 191, 194, 195, 183, 188, 391, 396, 418, 430

(56) References Cited

U.S. PATENT DOCUMENTS

| | | | | |
|---|---|---|---|---|
| 5,786,106 A | * | 7/1998 | Armani ........................ 429/98 |
| 5,901,206 A | * | 5/1999 | Soon ...................... 379/110.01 |
| 5,973,477 A | * | 10/1999 | Chang ......................... 320/114 |
| 6,038,491 A | * | 3/2000 | McGarry et al. ........... 700/231 |
| 6,165,002 A | * | 12/2000 | Kalis ........................... 439/358 |
| 6,254,249 B1 | * | 7/2001 | Kim et al. ................... 362/109 |
| 6,285,889 B1 | * | 9/2001 | Nykanen et al. ............ 455/557 |
| 6,292,674 B1 | * | 9/2001 | Davis .......................... 455/550 |
| 6,408,187 B1 | * | 6/2002 | Merriam ...................... 455/458 |

OTHER PUBLICATIONS

TANDY Corp "3D Aluminum Flashlight 610–2537 Specifications" Mar. 22, 1995.*

* cited by examiner

Primary Examiner—Thanh Cong Le
Assistant Examiner—Tanmay Lele

(57) ABSTRACT

Provided is a light accessory and a motion detector accessory attachable to a mobile communication device. The functionality of the devices can be incorporated into a single light and motion detector accessory. In general, the light accessory comprises a light of at least five lumens, and a logic circuit coupled to the light to provide a user control of the light. The motion detector accessory typically includes a motion detector and a logic circuit coupled to the motion detector. Also provided is a method for activating a motion detector on a mobile communication device accessory. The method includes the steps prepping a user for a motion detector accessory input; and executing a user selection for the motion detector accessory

15 Claims, 3 Drawing Sheets

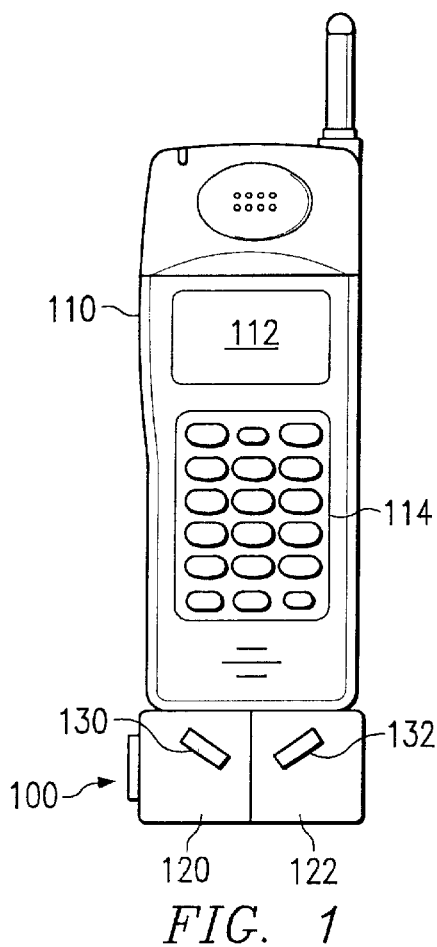
FIG. 1
FIG. 1a
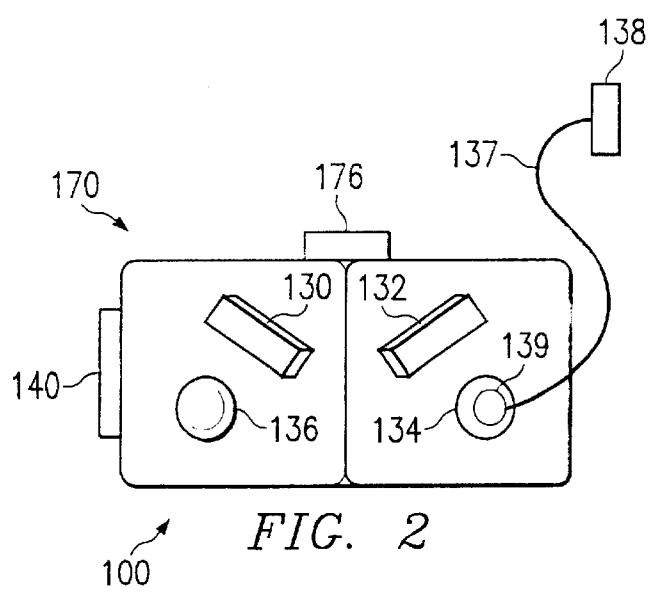
FIG. 2
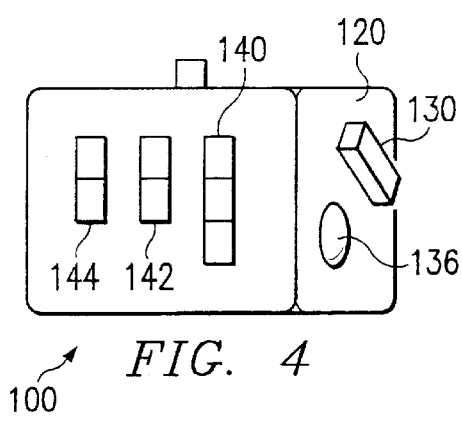
FIG. 4

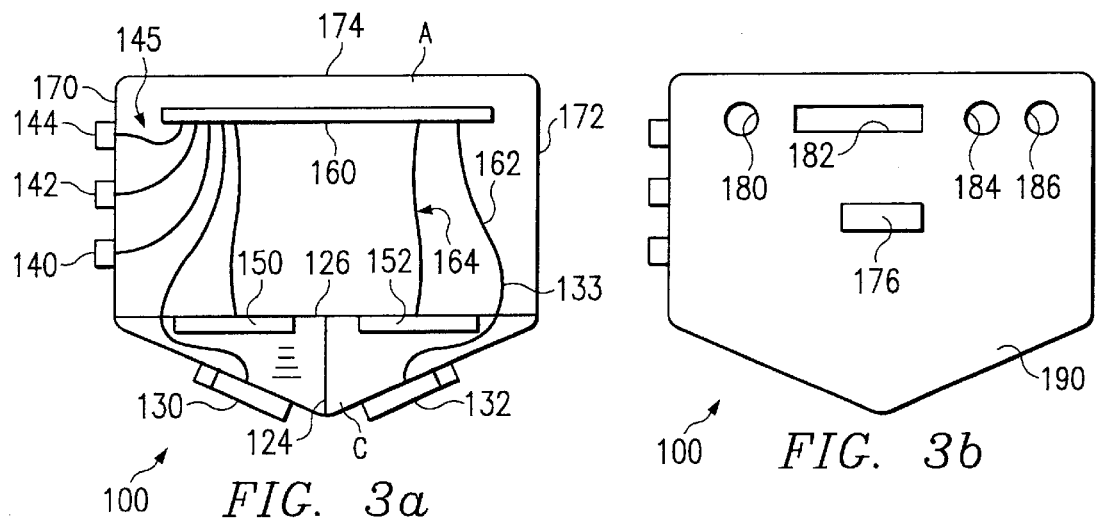
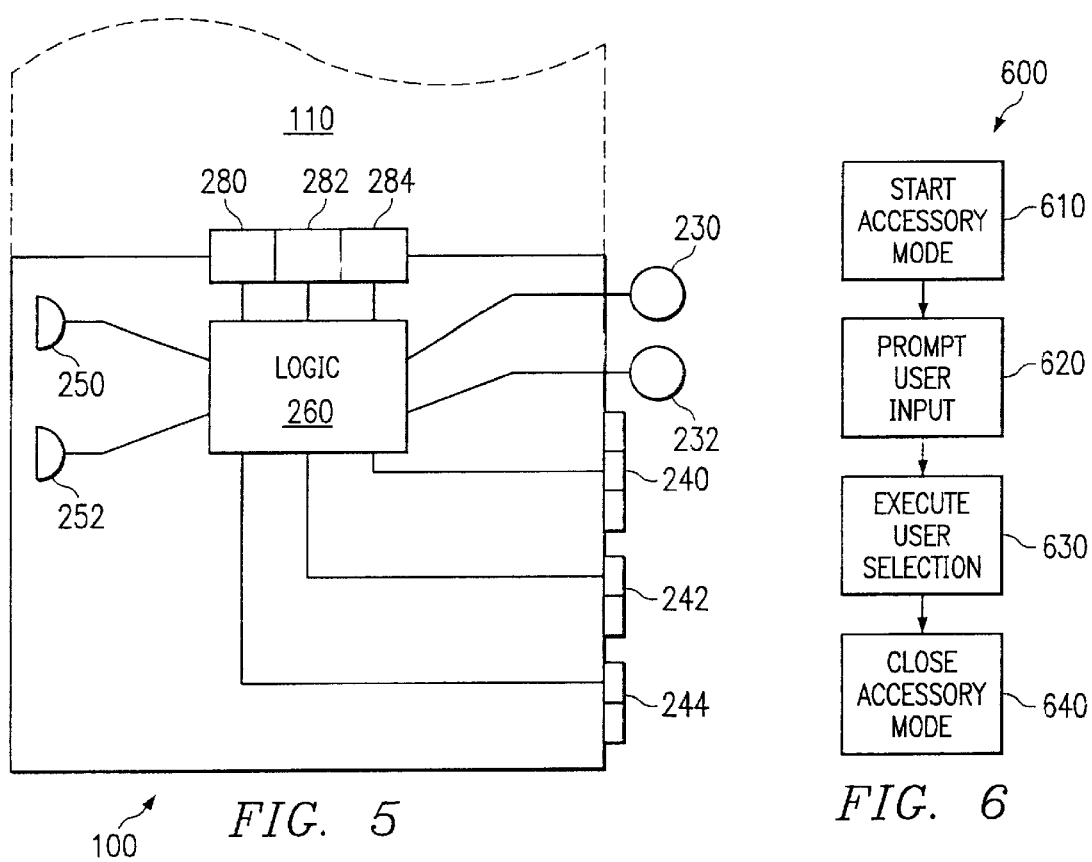

ACCESSORY FOR PROVIDING LIGHT BASED FUNCTIONALITY TO A MOBILE COMMUNICATIONS DEVICE

TECHNICAL FIELD

The present invention relates generally to accessories for mobile communications devices, and more particularly, to a device and computer algorithm for providing light-based functions to a mobile communications device.

BACKGROUND OF THE INVENTION

Mobile communications devices such as mobile phones, pagers, personal digital assistants (PDAs), and mobile computing devices (MCDs), are proliferating rapidly. As the price of mobile communications devices have come down, and the connection rates for using mobile communications devices have become more comparable for the rates associated with plain old telephone service (POTS), the use of mobile communication devices has moved beyond the office and into the home. For example, today people use mobile communication devices to keep in touch with family members and friends at times and in places when they would normally be out of touch.

Today, people take mobile communication devices with them for leisure activities, such as jogs and walks in the neighborhood. In addition, mobile communication devices provide security. For example, having a mobile communication device allows a user to have peace of mind associated with being able to summon aide in an isolated parking lot. When jogging or walking at night, many users of mobile communication devices also carry additional items with them. For example, when walking with a dog or other pet, the user will carry a dog chain. Also, when walking or jogging at night the user may carry a flashlight. Carrying these additional items makes it difficult to respond to a mobile communication device transmission, such as a phone call. In addition, when carrying these additional items, there is a risk associated with dropping an item as the user fumbles from item to item. Furthermore, it can be difficult to hear a mobile communication device "ringing" signal being outdoors.

Therefore, what is needed is a device and method that allows a user of a mobile communication device to coordinate the use of many items, including the mobile communication device. It would be advantageous to alert the user of an incoming phone call. In addition, it would be beneficial to incorporate security features in the mobile communications device. The present invention provides such assistance.

SUMMARY OF THE INVENTION

The present invention achieves technical advantages as a system and method of integrating a light and motion detector accessory (the accessory) with a mobile communication device. In a preferred embodiment, the accessory incorporates a dual light system where a first light is used to alert the user of an event, such as intrusion detected by a motion detector, or an incoming transmission, and a second light is provides flashlight quality illumination. The method prompts the user, from the mobile communication device, for a response corresponding to an accessory function, and allows a user to select an accessory function by pressing a key on the mobile communication device keypad. The accessory frees the user from having to carry a separate flashlight, provides the user with additional sensory stimuli for recognizing an incoming transmission, and enhances user security.

The present invention is implemented in one embodiment as a light accessory attachable to a mobile communication device. The light accessory generally comprises a light of at least five lumens, and a logic circuit is typically coupled to the light to provide a user control of the light and to control the output of the light with respect to intensity as well as time.

In another embodiment, the present invention is a motion detector accessory attachable to a mobile communication device. The motion detector accessory includes a motion detector, as well as a logic circuit coupled to the motion detector. The motion detector and the light accessory are preferably integrated into one device, using two lights to uniquely differentiate functions.

In yet another embodiment, the present invention is a method for activating a light accessory or a motion detector on a mobile communication, device accessory. The method generally includes the steps of prepping a user for a light accessory input and/or a motion detector by displaying information germane to the accessory, and executing a user selection for the light accessory.

BRIEF DESCRIPTION OF THE DRAWINGS

Other aspects of the invention, including specific embodiments, are understood by reference to the following Detailed Description of a Preferred Embodiment, which should be read in conjunction with the drawings, in which:

FIG. 1A shows a mobile phone having a light producing device integrally mounted into the mobile phone casing, and having a light producing device integrally disposed on the mobile phone battery;

FIG. 1 illustrates the light and motion detector (the accessories) attached to a mobile phone;

FIG. 2 is a front view of the accessory when separate from the mobile phone to illustrate additional detail of the accessory;

FIG. 3(*a*) is a top cut view of the accessory;

FIG. 3(*b*) is a top down view of the accessory showing the connections used to integrate the accessory with the mobile phone;

FIG. 4 provides a view taken along the first side of the accessory;

FIG. 5 is an electrical diagram which illustrates a system of the present invention;

FIG. 6 illustrates an algorithm shown generally as for implementing the present invention in a processor located in a mobile communication device.

DETAILED DESCRIPTION OF A PREFERRED EMBODIMENT

Figure 7A:
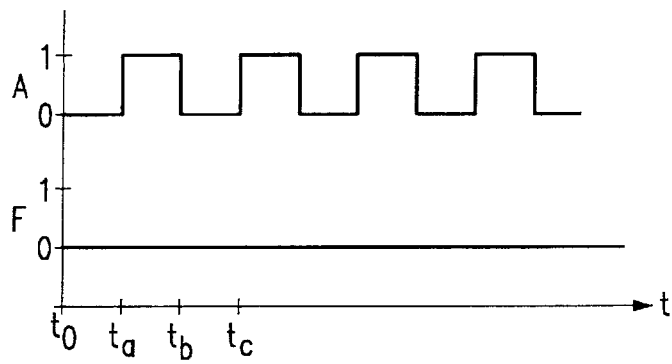
FIG. 7*a* illustrates graphically an alert light and flashlight combination where the alert light is flashing.

In a preferred embodiment, an accessory for a mobile communications device incorporates a dual light system. A first light, also known as an alert light, is used to alert the user of an event, such as a motion detected by a motion detector, for example, and a second light, typically a flashlight, provides flashlight quality illumination. A method according to the present invention prompts the user, from the mobile communication device, to press a key corresponding to an accessory function. The user then selects the accessory function by pressing a key from the mobile communication device keypad. Thus, the accessory frees the user from having to carry a separate flashlight, and uses the dual light system to provide the user with additional sensory stimuli for recognizing a predetermined event.

FIG. 1A shows a side view of a mobile phone having a first light producing device 30 integrally mounted into the mobile phone casing 10, and having a second light producing device 50 integrally disposed on the mobile phone battery 20. The first light producing device 30 or the second light producing device 50 illustrated in FIG. 1A could be a Light Emitting Diode (LED), a flashlight bulb, or any other device capable of producing sufficient illumination to allow a user to see his surroundings. The user activates the first light producing device 30 via a power button 40 which is integrated with the mobile phone casing 10, and the power button 40 operates like a power button in a typical flashlight. In other words, the power button turn "on" the light producing device when in an "on" state or position, and turns the light "off" when in an "off" state or position. Similarly, the first light producing device 30 could be activated by pressing a button on the mobile phone keypad, such as the "*" key (not shown). Likewise, an illumination device can be provided directly on the mobile phone battery 20.

The second light producing device 60 is integrally mounted onto the mobile phone battery 20. Like the power button 40 of the mobile phone, the mobile phone battery 20 has a power button 60 for activating the second light producing device 50. To better accommodate the second light producing device 50, the battery has a light cavity 22 built into it, and provides a transparent cover 24 to environmentally isolate the second light producing device 50. Although both the mobile phone battery 20 and the mobile phone illustrated in FIG. 1A are shown to have light producing devices 30, 50, it should be understood that the invention does not require that both the mobile phone and the battery 20 provide light sources. The invention specifically envisions providing a single light producing device, which could be on the mobile phone or, alternatively, on the mobile phone battery 20.

While the present invention can be incorporated with any mobile communications device, such as a mobile phone, a pager, a Personal Digital Assistant (PDA), or a Mobile Computing Device (MCD), for example, the present invention is discussed herein as being incorporated with a mobile phone. FIG. 1 illustrates a light and motion detector accessory (the accessory) 100 attached to a mobile phone 110. Accordingly, although the mobile phone 110 is shown as the communications device of FIG. 1, it should be understood that the mobile phone 110 can be read as being any mobile communication device, such as a mobile phone, pager, personal detail assistant (PDAs), or a mobile computing device (MCD). The mobile phone 110 is shown as having a display screen 112 for allowing a user to view mobile phone functions and for prompting user inputs, and a keypad 114 for enabling a user to input commands into a mobile phone 110, which may be then communicated to the accessory 100.

The accessory 100 has an alert light cover 120, and a flashlight cover 122, which together completely cover a front portion of the accessory 100. The alert light cover is typically a colored light filter that allows the user to more easily differentiate a flashing or steady light coming from the alert light cover 120 from a light coming from a flashlight cover 122. The alert light cover 120 is preferably tinted in orange, but may be any color or pattern of colors and may incorporate logos or other designs. The flashlight cover 122 is typically a resilient transparent material that allows light to pass through with little obstruction. However, the flashlight cover 122 may also incorporate colors or patterns, depending on user preferences. In addition, the alert light cover 120 is shown to have a first motion detector 130 thereon, and the flashlight cover 122 is shown to have a second motion detector 132 thereon.

The accessory 100 can be better understood by examining it apart from the mobile phone 110. FIG. 2 is a front view of the accessory 100 separated from the mobile phone 110 to illustrate additional detail of the accessory 100. The accessory 100 has a three-position switch 140 disposed on a first side 170. The three-position switch 140 is for selecting various accessory functions for a flashlight, which will be discussed shortly. Disposed on a top 190 of the accessory 100 is a positioning knob and lock 176 which engages and disengages into the mobile phone 110 so that the accessory 100 may be securably attached to the mobile phone 110. In addition, a first remote motion detector connector 136 is shown disposed on the alert light cover 120 just below the first motion detector 130. Likewise, a second remote motion detector connector 134 is shown disposed below the second motion detector 132.

The first motion detector connector 136 and the second motion detector connector 134 allow the user to remotely place a remote motion detector 138 in a location more convenient to the user. For example, the user could place the remote motion detector on the back of their shirt or blouse by using a velcro type attachment. Alternatively, the user could use the motion detector to monitor the presence of a pet, or place the device around a corner to monitor for intruders. The remote motion detector 138 is connected to the accessory 100 by a tether 137. The tether 137 is any standard wireline connector which plugs into the second remote motion detector connector 134 via the tether connector 139 and provides for communication between the accessory 100 and the remote motion detector 138. The tether 137, connector 139, and remote motion detector 138 typically comprise a single assembly, and have the general appearance of an earphone and jack.

Most of the components of the accessory 100 can be seen by removing the top 190 of the accessory 100. FIG. 3(*a*) is a top-cut view of the accessory 100. Accordingly, the accessory 100 is generally divided into three chambers—a first chamber A, a second chamber B and a third chamber C. The first chamber A is generally defined by the first side 170 the back 174 a second side 172 and a light mount 126. The second chamber B is defined by the alert light cover 120, a light-cover separator 124, and the light mount 126. Likewise, the third chamber C is defined by the light separator 124, a flashlight cover 122, and the light mount 126.

Disposed on the first side 170 is a three-position switch 140. In a first position, the user may press and hold the switch to turn on the flashlight. In the second position, the flashlight will be on continuously. In the third position, the flashlight will blink, either continuously, or at the detection of a predetermined event. Also shown on the first side 170 is a first two-position switch 142 for turning a ring detector on or off. Furthermore, a third two-position switch 144 is disposed on the first side 170 and turns a motion detector on or off. Of course, different switch combinations are possible, and may incorporate different accessory functions.

Furthermore, in one embodiment, the switches 140, 142, 144 may be omitted and the accessory may achieve functionality by interfacing directly with the mobile phone 110, as discussed later.

Signals from the switches 140, 142, and 140 are carried to a logic circuit 160 via wires 145. The logic circuit 160 may be a custom designed circuit board having standard logic chips, a digital signal processor (DSP), or any other type of logic device, including a microprocessor. Furthermore, the logic device 160 provides for power transfer from a power device located with mobile phone 110 to power an alert light bulb 150, which is removably mounted into light mount 126, and is in the second chamber B. Likewise, the logic device 160 also provides power to a flashlight light bulb 152, which is removably mounted in the light mount 126, and is in the third chamber C. Accordingly, power is delivered to the alert light bulb 150 and the flashlight light bulb 152 via a power connection shown as 164. The flashlight light bulb 152 and the alert light bulb 150 are standard light bulbs of common flashlight intensity. For example, common flash light light bulbs are available in intensities of 5 lumens, 8 lumens, 10 lumens, 20 lumens, and light bulbs of even greater rightness can be used—up to thousands of lumens (a 100 watt bulb can have an intensity of 1700 lumens). The logic circuit 160 may be mounted in the first chamber A to any surface and in any geometrical configuration. A motion detector connection 133 is shown between the logic circuit 160 and the first motion detector 130 and the first remote motion detector connector 136 (not shown). The motion detector connection 133 is also shown between the logic circuit 160 and the second motion detector 132 and the second remote motion detector connector 134 (not shown).

The top 190 of the accessory provides for integration with the mobile phone 110. FIG. 3(b) is a top down view of the accessory 100 showing the connections used to integrate the accessory 100 with the mobile phone 110. The accessory 100 has top 190 having the positioning knob and lock 176 thereon. The position knob and lock 176 align the accessory 100 with the mobile phone 110, and via a spring actuated assembly (not shown) allows the user to mechanically engage the accessory 100 into the mobile phone 110. When the user wishes to disengage the accessory 100 and the mobile phone 110, the user need only pull on the accessory 100 with a threshold amount of force to disengage the accessory 100 from the mobile phone 110. Of course, other devices may be used to secure and position the accessory 100 with the mobile phone 110.

Also disposed on the top 190 are connections for enabling the accessory 100 to communicate with the mobile phone 110. A ground connection 180 electrically connects the accessory 100 with the ground of the mobile phone 110. Likewise, a power connection 186 delivers power from the mobile phone 110 to the accessory 100. Also provided is a serial port 182 for enabling serial communications between the accessory 100 and the mobile phone 110 as well as a parallel port connection 184 for providing serial data transfer between the accessory 100 and the mobile phone 110. Although not shown, a mobile phone 110 has connections and attachments that mirror those of the accessory 100. Accordingly, the accessory 100 has many embodiments that incorporate the unique features and attachment requirements of the specific type of cell phone or other mobile communication device to which they are attached.

FIG. 4 provides a view of the first side 170 of the accessory 100. From this side view one can see the relative positions of the three-position switch 140, the first two-position switch 142, and the second two-position switch 144. It should be noted, however, that the switches are provided to enable manual operation apart from the cell phone 110. Accordingly, when the accessory 100 is controlled through the mobile phone 110, the three-position switch 140, the second position switch 142, and the second two-position switch 144 can be eliminated from the design, and thus, may be viewed as optional. When the switches 140, 142, and 144 are not incorporated into the accessory 100, the functionality of the accessory is accomplished through software in the cell phone 110.

By representing the components of the accessory 100 in a block format, electrical connections made in the device are more clearly understood. Accordingly, FIG. 5 is a block-electrical diagram that illustrates an electrical system of the present invention. Shown within the accessory 100 is logic circuit 260. Logic circuit 260 is in communication with a mobile communication device 110 via a ground connection 280, a power connection 282, and a communication connection 284. Of course, more or fewer connections may be employed depending on the type of mobile communication device 110 to which the accessory is designed to mate. The communication connection 284 provides data transfer between a processor located in a mobile communication device in the logic circuit 260 contained within the accessory 100, and could be a serial connection, a parallel connection, or an infra red connection, for example.

A first motion detector 230 and a second motion detector 232 are also shown coupled to the logic circuit 260, and are illustrated as being located remotely, in this example, from the assembly 100. Shown disposed on the assembly 100 is a first three-position switch 240 for turning on and off flashlight 250, as well as for providing other functionality to the flashlight 250. Also disposed on the assembly 100 is a first second position switch 142 which may, for example, turn on and off a ring detector. A second two-position switch 244 is also disposed on the assembly 100 and may, for example, turn on and off the first motion detector and the second motion detector 232 by signaling an on and off command to the logic circuit 360. Of course more switches may provide additional functionality to the assembly 100. Also coupled to the logic circuit 260 are the flashlight light bulb 250 and the alert light bulb 252.

As alluded to above, the assembly 100 may achieve functionality through an algorithm that runs in the mobile communication device, where the algorithm may be implemented as software. FIG. 6 illustrates an algorithm 600 for implementing the present invention in a processor located in a mobile communication device. In a start accessory step 610 the user selects, through the mobile communication device keypad 114, an option which will initiate the accessory 100. Next, in a prompt user input step 620 the algorithm 600 displays to the user in the display screen 112 of the mobile communication device the various options which the user may implement in the accessory 100.

Next, after a user enters a selection, which will be typically be accomplished through the keypad 114, but may be accomplished through other means, such as voice recognition, the processor sends a command to the accessory 100 through the connection 284 to initiate the proper accessory function. The accessory function is then executed in an execute user selection step 630, where the accessory 100 executes the user selected operation for a predetermined period of time. Eventually, the user will want to end interacting with the accessory 100, and after entering the appropriate key sequence, the algorithm 600 proceeds to a close accessory mode step 640 which allows the mobile communication device 110 to end the powering of the accessory 100 through the power connection 282. These steps may be implemented in software through modular programming, where a start accessory module implements the start accessory step 610, a prompt user input module implements the prompt user input step 620, an execute module accomplishes the execute user selection step 630, and a close accessory mode module implements the close accessory mode step 640.

FIGS. 7a–7d illustrate graphically how the alert light and the flashlight could be configured to incorporate a motion detector function and a flashlight function. Each of the FIGS. 7a–7d display time, represented as t, across the horizontal axis. Across the horizontal axis are illustrated time ta, tb, and tc, where time ta is a start of a period, tb is a transition time, and tc is an end of the period. Indicated on the vertical axis is the on and off state of the alert light A, shown as an alert light line A, and the on and off state of the flashlight F, shown as a flashlight line F. The state of either of the flashlight or the alert light is indicated as being "on" when the corresponding flashlight line F, or the alert line A, is a 1 (indicating that the light is on). Likewise, the state of the flashlight or the alert light is as being "off" when the corresponding flashlight line F, or the alert line A, is a 0 (indicating that the light is off).

FIG. 7a illustrates graphically an alert light and flashlight combination where the alert light is flashing. The alert light will blink to indicate that a function is being activated. The rate of the blink is indicated by a time period between ta and tc, where the alert light is on for time ta to tb, where the light transitions from on to off. The light then stays off between time tb and tc, and then begins another period. The number of periods for some unit of time is called the rate of the blink. For example, when the ring detector switch is on, but the motion detector switch is off, and the flashlight is off or on (though shown as off in FIG. 7a), when the ring detector detects a ring, in addition to producing a traditional audible ring, the accessory will blink the alert light. As another example, when the motion detector accessory is activated, and the flashlight is off or on (though shown as off in FIG. 7a), the alert light will blink slowly to indicate that the motion detector is on and working. Alternative, the alert light may blink when any feature of the accessory is active, to indicate to the user that the accessory is active.

Figure 7B:
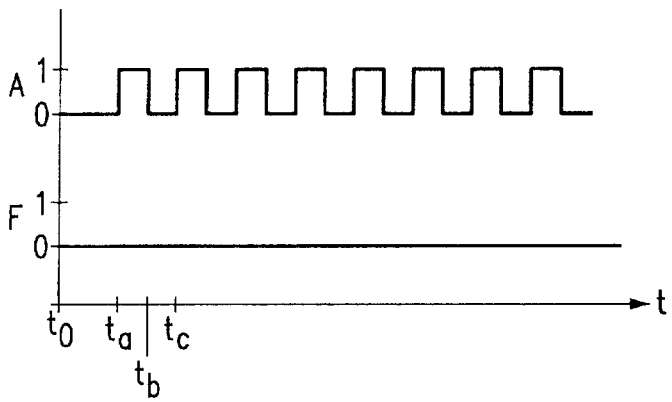
FIG. 7*b* illustrates graphically an alert light and flashlight combination where the flashlight is flashing.

FIG. 7b illustrates graphically an alert light and flashlight combination where the alert light is flashing rapidly to indicate that an event has been detected. For example, when the motion detector is turned on, the alert light may blink at the rate illustrated in FIG. 7a. However, when an event occurs, such as when the motion detector detects motion, the user needs to be able to quickly notice the event. One way to do this is to increase the rate of the blink of the alert light. Accordingly, the time of the period from ta to tc in FIG. 7b is less than the time period from ta to tc in FIG. 7a. The shorter time period of FIG. 7b could also be used to indicate an incoming call, as well.

Figure 7C:
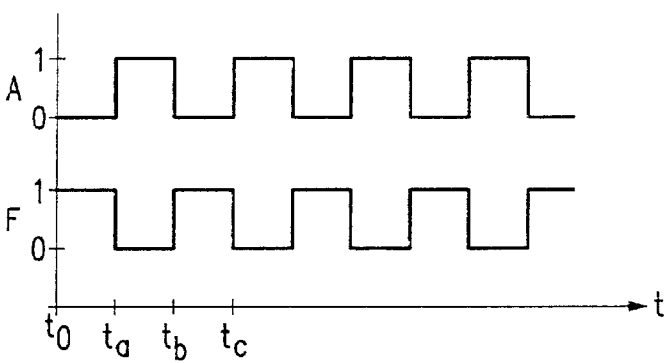
FIG. 7*c* illustrates graphically an alert light and flashlight combination where the alert light and flashlight are flashing.

FIG. 7c illustrates graphically an alert light and flashlight combination where the alert light and flashlight are flashing. In FIG. 7c, it is illustrated that the lights are blinking intermittently, that is to say, the alert light is off from time ta to tb, and then on from time tb to time tc. Likewise, the flashlight is on from time ta to tb, and is off from time tb to tc. The use of a second flashing light provides additional signaling options to a user. For example, graph of FIG. 3 could illustrate the alert light and flashlight blinking intermittently to signal that a transmission is incoming the mobile communication device while the motion detector is on.

Figure 7D:
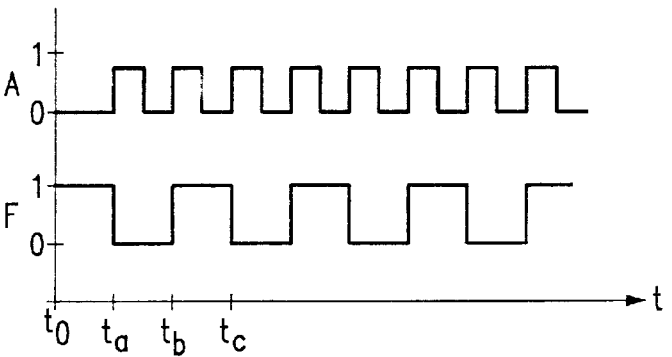
FIG. 7*d* illustrates graphically an alert light and flashlight combination where the alert light is flashing an alert signal and the flashlight is flashing.

FIG. 7d illustrates graphically an alert light and flashlight combination where the alert light is flashing an alert signal and the flashlight is flashing. The graph of FIG. 7d illustrates the alert light blinking at a rate faster than flashlight rate. This flashing combination could be used to indicate the occurrence of specific events. For example, assume the accessory is operating as illustrated in FIG. 7c, and assume the motion detector detects a motion. One way to indicate this event is to increase the blink rate of the alert light to indicate that a motion has been detected by the motion detector (the flashlight continues blinking to indicate an incoming transmission to the mobile communication device). Likewise, the occurrence of other events can be communicated to a user in a like manner.

As discussed above, each of the alert line A, and the flashlight line F, have a high position and a low position where the high position illustrates that the respective light is on and the low position indicates that the respective light is off. However, it should be noted that each blink may incorporate a different intensity to inform the user that a specific function is being executed, or to indicate a level of intensity of an event. For example, the alert light may blink brighter and brighter as a closer and closer motion is detected.

Although each time period is seen as uniform in each graph the present invention did not be so limited. For example, each blink may last a non-uniform length of time, or the blinks could repeat patterns to indicate codes that correspond with different accessory functions.

While the invention has been described in conjunction with preferred embodiments, it should be understood that modifications will become apparent to those of ordinary skill in the art and that such modifications are therein to be included within the scope of the invention and the following claims.

We claim:

1. An accessory attachable to a mobile communication device, comprising:

a housing adapted to selectively couple the accessory to the mobile communication device, wherein the accessory includes a light source of at least five lumens and a motion detector disposed in the housing, and the light source blinks at a first rate when a call is received at the mobile communication device, and the light source blinks at a second rate when motion is detected by the motion detector; and a logic circuit coupled to the light source and disposed in the accessory, the logic circuit providing a user interactive control of the light source through the mobile communications device.

2. The accessory of claim 1 further comprising a second light source coupled to the logic circuit, the second light source being disposed in the housing.

3. The accessory of claim 1 wherein the motion detector is coupled to the logic circuit.

4. Provide accessory of claim 1 further comprising a cable for electrically coupling the accessory to the mobile communication device.

5. The accessory of claim 1 wherein the logic circuit is in communication with a processor in the mobile communication device.

6. The accessory of claim 1 wherein the logic circuit comprises a Digital Signal Processor (DSP).

7. The accessory of claim 1 wherein the light source blinks when a transmission is received by the mobile com munication device, and wherein the blink is controlled by the logic circuit.

8. The accessory of claim 1 wherein the light source blinks when the motion detector detects a motion, and wherein the blink is directed by the logic circuit.

9. The accessory of claim 1 further comprising a switch for enabling the user to activate a motion detector, the switch being coupled to the logic circuit.

10. The accessory of claim 2 wherein the first light and the second light alternate illumination.

11. The accessory of claim 1 wherein the housing has a top configured to be integrally connected to the mobile communications device.

12. The accessory of claim 11 further comprising a positioning knob and lock disposed on the top the accessory for engaging and disengaging the accessory with the mobile communications device.

13. The accessory of claim 11 further comprising at least one connection for enabling the mobile communications device to communicate with the accessory.

14. The accessory of claim 13 wherein the connection comprises a serial port.

15. The accessory of claim 13 wherein the connection comprises a parallel port.

* * * * *